US012130929B2

(12) United States Patent
Kanani et al.

(10) Patent No.: US 12,130,929 B2
(45) Date of Patent: Oct. 29, 2024

(54) SUBJECT LEVEL PRIVACY ATTACK ANALYSIS FOR FEDERATED LEARNING

(71) Applicant: Oracle International Corporation, Redwood City, CA (US)

(72) Inventors: Pallika Haridas Kanani, Westford, MA (US); Virendra J. Marathe, Florence, MA (US); Daniel Wyde Peterson, Firestone, CO (US); Anshuman Suri, Charlottesville, VA (US)

(73) Assignee: Oracle International Corporation, Redwood City, CA (US)

( * ) Notice: Subject to any disclaimer, the term of this patent is extended or adjusted under 35 U.S.C. 154(b) by 430 days.

(21) Appl. No.: 17/681,638

(22) Filed: Feb. 25, 2022

(65) Prior Publication Data

US 2023/0274004 A1    Aug. 31, 2023

(51) Int. Cl.
*G06F 21/57* (2013.01)
*G06F 21/62* (2013.01)

(52) U.S. Cl.
CPC ........ *G06F 21/577* (2013.01); *G06F 21/6245* (2013.01); *G06F 2221/033* (2013.01)

(58) Field of Classification Search
CPC ............ G06F 21/577; G06F 2221/033; G06N 20/00–20
See application file for complete search history.

(56) References Cited

U.S. PATENT DOCUMENTS

| | | | |
|---|---|---|---|
| 2020/0134180 A1 | 4/2020 | Lal et al. | |
| 2022/0004933 A1 | 1/2022 | Gu et al. | |
| 2023/0009999 A1* | 1/2023 | Higuchi | G06F 18/214 |
| 2023/0315839 A1* | 10/2023 | Tsuchida | G06N 20/00 |
| | | | 726/22 |

OTHER PUBLICATIONS

V. J. Maratha and P. Kanani, "Subject Granular Differential Privacy in Federated Learning," CCS 2021 Workshop on Privacy Preserving Machine Learning (PPML), 2021, pp. 1-5.
B. McMahan, E. Moore, D. Ramage, S. Hampson, and B. A. y Arcas, "Communication-Efficient Learning of Deep Networks from Decentralized Data," in Artificial intelligence and statistics. PMLR, 2017, pp. 1273-1282, arXiv:1602.05629v3 (pp. 1-11).

(Continued)

*Primary Examiner* — Matthew T Henning
(74) *Attorney, Agent, or Firm* — S. Scott Foster; Kowert, Hood, Munyon, Rankin & Goetzel, P.C.

(57) ABSTRACT

Subject level privacy attack analysis for federated learning may be performed. A request that selects an analysis of one or more inference attacks may be received to determine a presence of data of a subject in a training set of a federated machine learning model. The selected inference attacks may be performed to determine the presence of the data of subject in the training set of the federated machine learning model. Respective success measurements may be generated for the selected inference attacks based on the performance of the selected inference attacks, which may then be provided.

20 Claims, 8 Drawing Sheets

(56) References Cited

OTHER PUBLICATIONS

K. Wei, J. Li, M. Ding, C. Ma, H. H. Yang, F. Farokhi, S. Jin, T. Q. Quek, and H. V. Poor, "Federated Learn ing with Differential Privacy: Algorithms and Performance Analysis," IEEE Transactions on Information Forensics and Security, vol. 15, pp. 3454-3469, 2020, preprint at arXiv:1911.00222 (pp. 1-15; 2019).
C. Dwork, A. Roth et al., "The algorithmic foundations of differential privacy." Found. Trends Theor. Comput. Sci., vol. 9, No. 3-4, pp. 211-407, 2014.
R. Shokri, M. Stronati, C. Song, and V. Shmatikov, "Membership inference attacks against machine learning models," 2017, arXiv:1610.05820, pp. 1-16.
M. Jegorova, C. Kaul, C. Mayor, A. Q. O'Neil, A. Weir, R. Murray-Smith, and S. A. Tsaftaris, "Survey: Leakage and privacy at inference time," Jul. 2021, arXiv:2107.01614, pp. 1-22.
A. Suri and D. Evans, "Formalizing and Estimating Distribution Inference Risks," arXiv preprint arXiv:2109.06024, 2021, pp. 1-19.
K. Ganju, Q. Wang, W. Yang, C. A. Gunter, and N. Borisov, "Property Inference Attacks on Fully Connected Neural Networks using Permutation Invariant Representations," in Proceedings of the 2018 ACM SIGSAC conference on computer and communications security, 2018, pp. 619-633.
W. Zhang, S. Tople, and O. Ohrimenko, "Leakage of Dataset Properties in {Multi-Party} Machine Learning," in 30th USENIX Security Symposium (USENIX Security 21), 2021, pp. 2687-2704.
D. Pasquini, G. Ateniese, and M. Bernaschi, "Unleashing the tiger: Inference attacks on split learning," in Proceedings of the 2021 ACM SIGSAC Conference on Computer and Communications Security, 2021, pp. 2113-2129.
V. Papyan, X. Y. Han, and D. L. Donoho, "Prevalence of neural collapse during the terminal phase of deep learning training," Proceedings of the National Academy of Sciences, vol. 117, No. 40, 2020, pp. 1-12.
S. Yeom, I. Giacomelli, M. Fredrikson, and S. Jha, "Privacy Risk in Machine Learning: Analyzing the Connection to Overfitting," in 2018 IEEE 31st computer security foundations symposium (CSF). IEEE, 2018, pp. 268-282, arXiv:1709.01604v5 (pp. 1-27).

\* cited by examiner

SUBJECT LEVEL PRIVACY ATTACK ANALYSIS FOR FEDERATED LEARNING

BACKGROUND

Machine learning models provide important decision making features for various applications across a wide variety of fields. Given their ubquity, greater importance has been placed on understanding the implications of machine learning model design and training data set choices on machine learning model performance. Systems and techniques that can provide greater insight into the various properties of machine learning models are, therefore, highly desirable.

SUMMARY

Techniques for subject level privacy attack analysis for federated learning may be performed by various systems, services, or applications. Different subject level inference attacks when performed on a given federated machine learning model may offer different ways of obtaining subject data used to train the machine learning model, providing insight into the vulnerability of the federated machine learning model to expose subject data to attackers. Analysis of the different inference attacks may be performed and used to generate respective success measurements for the inference attacks. A result of the analysis including the respective success measurements can then be provided.

Figure 1:
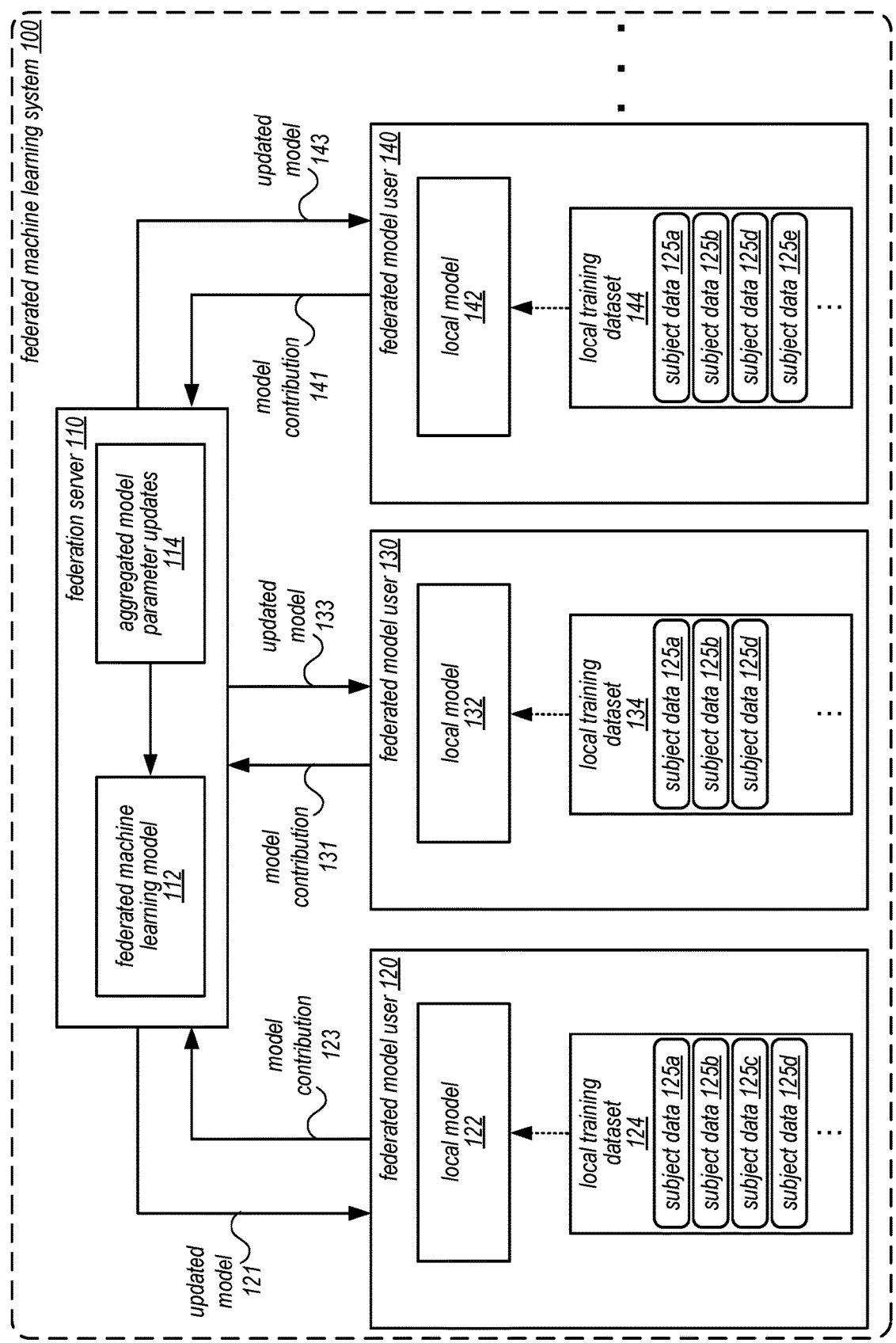
FIG. 1 is a logical block diagram illustrating a federated machine learning system, according to some embodiments.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (e.g., meaning having the potential to) rather than the mandatory sense (e.g. meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Various techniques for subject level privacy attack analysis for federated learning are described herein. Federated learning allows multiple parties to collaboratively train a machine learning model while keeping the training data decentralized. Federated learning was originally introduced for mobile devices, with a core motivation of protecting data privacy. In a cross-device setting (e.g., across mobile devices), privacy is usually defined at two granularities: first, item-level privacy, which describes the protection of individual data items and user-level privacy, which describes the protection of the entire data distribution of the device user.

Federated learning is now also employed in collaborations between larger organizations or data centers across geographies (which is sometimes referred to as a cross-silo setting for federated machine learning). The "users" of the federation in such settings are the organizations, such as a group of retailers or hospitals, who in turn might have collected data about individuals. These individuals are often referred to as data subjects. Furthermore, data about one subject might be spread across multiple "users" of the federation. For example, a consumer shopping at multiple retailers or a patient going to multiple hospitals may be the same subject whose data is collected for or used at multiple users. Given that subjects data can be spread across users, item-level and user-level privacy definitions may be insufficient to address the need to protect an individual's data in such a scenario. Thus, another way of analyzing privacy with respect to federated machine learning models, called subject level privacy, may be is considered, in various embodiments, which aims to more precisely describe the protection of the data distribution of a data subject in scenarios like cross-silo federated learning.

Note that subject level privacy may or may not be distinct from item-level or user-level privacy, depending on how the data is setup. For example, data sets in which one row of data corresponds to one person, item-level privacy may be sufficient to protect the individual's identity. Similarly, in cross-device federated learning settings, the distinction between user-level and subject level privacy may be somewhat blurred, in some scenarios, because there is roughly a one-to-one correspondence between a data subject and a device, which acts as a user in the federation: each device typically holds the data from just one individual, and each individual's data is typically stored in just one (or few) devices. However, in scenarios like a cross-silo setting, in which users are large organizations collecting data from a large number of individuals, and a data subject can easily be associated with a number of different users in the federation, this distinction becomes much more significant. Subject-level privacy formulation may therefore be important in preserving the privacy of an individual, not just that of a data item or a "data silo."

Even though federated learning offers first level privacy by keeping training data in place, the federated machine learning model trained using this data is prone to a variety of inference attacks that aim to reveal some part of the private information in the original training data. One example, membership inference attacks, can reveal if a particular data point was included in the original dataset used for training a machine learning model.

In various embodiments, different subject level privacy inference attacks may be implemented to provide an analysis of the privacy afforded to subjects in a federated machine learning model. These subject level privacy inference attacks may infer the presence of an individual's data, particularly in cross-silo federated learning. By measuring the effectiveness of such attacks, machine learning practitioners may be able to assess the vulnerability of the federated learning model and estimate the risk of privacy leakage in order to determine remedial actions (e.g., modifying the architecture or configuration of the federated machine learning model or implementing mitigation measures to obscure training data).

In various embodiments, federated machine learning model analysis systems, like federated machine learning model analysis system 210 discussed below with regard to FIG. 2, may utilize different kinds of subject level inference attacks in order to consider different privacy vulnerabilities of a federated machine learning model. IN some embodiments, a threat model may be assumed in which either one of the federation users or the federation server could be adversarial. For these subject level inference attacks it may be assumed that the model would perform better on data similar to that it has encountered at training time compared to the data it has not seen during training. However, unlike techniques which check for membership of specific data points, a sample from target subject's data distribution to ascertain the subject's presence in the training data may be used. In this sense, these subject level inference attacks can also be considered distribution inference attacks. In various embodiments, one example of these attacks may check the loss values on data points sampled from target subjects' data distribution against a threshold. Another example of a subject level inference attack tracks the changes to the loss across training rounds and a further example of a subject level inference attack examines loss around the neighborhood of the data sample.

Success of privacy attacks on machine learning models may depend on both the nature of the training data as well as the type of modeling technique. A federated learning system with multiple users and data subjects can be quite complex and the effectiveness of privacy attacks can greatly be influenced by a variety of factors. Therefore, an understanding of the effectiveness of subject level inference attacks can help machine learning practitioners improve the design or architecture of a federated machine learning model. In some embodiments, results of the analysis of these inference attacks can indicate if mitigation strategies, which if over used could reduce the effectiveness of a federated machine learning model.

For example, mitigation strategies used to provide machine learning privacy may be used, such as Differential Privacy (DP). Differential privacy may be implemented by bounding the maximum impact a single data item can have on the output of a randomized algorithm. A randomized algorithm $A:V \rightarrow R$ is said to be $(\varepsilon, \delta)$—differentially private if for any two adjacent datasets $D, D' \in V$, and set $S \subseteq R$, $$P(A(D) \in S) \leq e^{\varepsilon} P(A(D')) \in S) + \delta$$

where $D, D'$ are adjacent to each other if they differ from each other by a single data item. During training, the impact of singular training data items may be constrained by gradient clipping and injection of carefully calibrated noise in the parameter updates. Note that other techniques mitigating privacy leaks can be implemented, and thus previous example is not intended to be limiting.

Federated learning operates on data just as any other machine learning algorithm: extracting and learning features from observations that can be helpful in predictions on unseen data. However, the changes in the training environment as well as distribution of train data across clients can significantly influence properties of the federated machine learning models. Factors like the number of clients and number of training rounds are known to directly affect convergence performance and privacy protection.

Some data privacy techniques focus on item-level privacy: measuring and protecting the privacy of individual training examples. However, in federated learning, each user of the system sends back gradients corresponding to a batch of examples. Even if no single data point is leaked in this process, the evolution of the federated learning model gives information about the batches of training data-since a user has multiple data points, the user's privacy may be compromised beyond what the item-level privacy guarantee would suggest. Measuring and bounding the privacy loss to users leads naturally to user-level privacy. However, in subject level privacy there may be multiple data points about a particular individual (subject) in the dataset as there is not a 1-to-1 mapping between subjects and federated learning users. This situation occurs commonly in real-world datasets, because a federated learning user may have data about multiple subjects in its dataset, or the same subject may have records scattered across several federated learning users.

To illustrate the differences using a real-world analogy, consider a dataset of grocery store market baskets, collected over time, and with each basket having a corresponding member ID. If each grocery location aggregates its purchases to train a model, the majority of households may be found to shop multiple times over the year, and that any individual may sometimes shop at different stores. Item-level privacy tries to protect information about particular market baskets, so that no single checkout can be identified definitively. User-level privacy will guarantee the privacy of individual stores, ensuring that no single neighborhood can be identified within the dataset. Subject-level privacy will make sure that no household's data is compromised, despite making multiple purchases across multiple stores.

In the various embodiments, the following description provides various example scenarios in which subject level privacy may be assessed using inference techniques. As an assumption of analysis, in some scenarios, a passive adversary that wants to infer membership of a particular subject in the federation can utilize these subject level inference attacks. Such an attacker can exist as a hostile federation server or a honest-but-curious user in the federation. In either case, by the design of federated learning, the attacker has access to the global model's weights after each federation round.

Let $S_0$ and $S_1$ be two sets of subjects, and $S_{interest}$ the subject whose membership the adversary wants to infer, such that $S_{interest} \notin S_0$, $S_1$. Let $D_s$ be the distribution corresponding to subject s. Then, using the definitions of distribution inference, a subject-membership inference task can be formulated as differentiating between models trained on datasets sampled from either of these distributions:

$$G_0: \bigcup_{s \in S_0} d \sim D_s$$

$$G_1: \bigcup_{s \in S_1} d \sim D_s$$

where $S_1 = S \cup \{s_{interest}\}$. The first distribution $G_0$ corresponds to the absence of subject of interest in the federation, while $G_1$ includes it.

For the task of subject level membership inference, it may be noted that it does not matter how a subject's data is divided across different users of the federation. Even if only one user has the subject's data, or if the same data is divided across all users, the subject's data is ultimately used in the overall training process and thus the subject should be inferred as being present. The adversary may only care about the subject's presence in the overall federation and using a formulation like the one above is apt for the given threat model. This, of course, is barring highly-unlikely situations where sampling users in each federation round leads to the user(s) with the subject's data not participating at all in the federation. In such a case the subject's data has technically not been used in the training, and thus should not be inferred as being present.

FIG. 1 is a logical block diagram illustrating a federated machine learning system, according to some embodiments, which may show scenarios in which subject's data may be included in a federated machine learning model and in which an understanding of subject level privacy concerns may occur. A federated machine learning system 100 may include a central aggregation server, such as federated server 110 and multiple federation model users 120, 130, and 140 that may employ local machine learning systems, in various embodiments. The respective federation server 110 and users 120, 130 and 140 may be implemented, for example, by computer systems 1000 (or other electronic devices) as shown below in FIG. 8. The federation server 110 may maintain a federated machine learning model 112 and, to perform training, may distribute a current version of the machine learning model 112 to the federation users 120, 130, and 140 (as indicated by respective updated models 121, 131, and 141).

After receiving a current version of the machine learning model 112, individual ones of the federation users 120, 130 and 140, may independently generate locally updated versions of the machine learning models 122, 132, and 142 by training the model using local, training datasets 124, 134, and 136. This independently performed training may then generate model parameter updates that provide respective model contributions 123, 133, and 143 to federation server 110.

Individual ones of the federation users 120 may independently alter, by clipping and applying noise, to their local model parameter updates to generate modified model parameter updates, where the altering provides or ensures privacy of their local training datasets 124, 134, and 144, in some embodiments.

Upon receipt of the collective modified model parameter updates, the federation server 110 may then aggregate the respective modified model parameter updates to generate aggregated model parameter updates 114. The federation server 110 may then apply the aggregated model parameter updates 114 to the current version of the federated machine learning model 112 to generate a new version of the model 112. This process may be repeated a number of times until the model 112 converges or until a predetermined threshold number of iterations is met.

FIG. 1 illustrates an example of scenarios where a subject's data can be included in the local training data sets of different users. For example, local training dataset 124 includes subject data 125a, 125b, 125c, and 125d for federated model user 120. For federated model user 130, local training data set 134 may include some of the same subjects (e.g., subject data 125a, 125b, and 125d). For federated model user 140, local training data set 144 may include some of the same subjects (e.g., subject data 125a, 125b, 125d, and 125e).

The specification next discusses an example implementation of a federated machine learning model analysis system that can implement the above subject level inference attack techniques. Then, various exemplary flowcharts illustrating methods and techniques, which may be implemented by this federated machine learning model analysis system or other systems or applications are discussed. Finally, an example computing system is discussed upon which various embodiments may be implemented is discussed.

Figure 2:
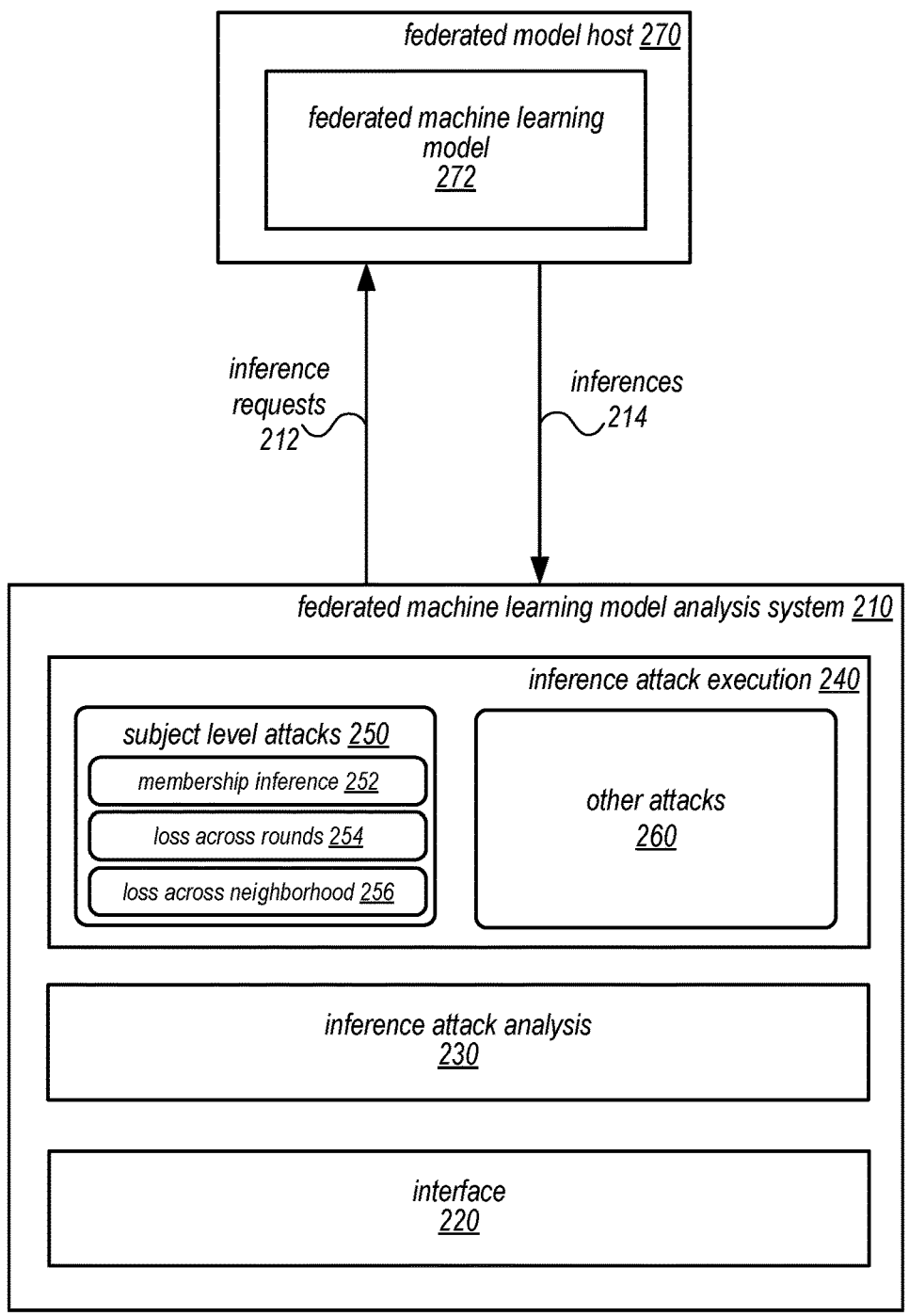
FIG. 2 is a logical block diagram illustrating a federated machine learning analysis system that implements subject level privacy attack analysis for federated learning, according to some embodiments.

FIG. 2 is a logical block diagram illustrating a federated machine learning analysis system that implements subject level privacy attack analysis for federated learning, according to some embodiments. Federated machine learning model analysis system 210 be a standalone system, tool, service, or other application, in some embodiments, or may be implemented as part of a cloud provider or other public network accessible service. In some embodiments, federated machine learning model analysis system 210 may be implemented as a sub-system as part of a larger system or service. For example, federated machine learning model analysis system 210 may be an analysis tool that is implemented in a federated machine learning system 100.

Federated machine learning model analysis system 210 may implement interface 220, in some embodiments. Interface 220 may be a command line, graphical, or programmatic interface (e.g., invoked via Application Programming Interfaces (APIs)). Interface 220 may support various requests, such as those discussed in detail below with regard to FIG. 6, which may support requests for inference attack analysis and provide various forms of providing results of inference attack analysis (e.g., via textual or graphical displays).

Interface 220 may dispatch requests for inference attack analysis to various other features of federated machine learning model analysis system 210, such as requests to inference attack analysis 230 and/or inference attack execution 240. Inference attack execution 240 may, in various embodiments support the performance of many different attacks in order to provide an analysis of privacy and other weakness of a federated machine learning model. For example, as discussed above and in detail below with regard to FIGS. 3-5, different subject level inference attacks 250 may be performed by inference attack execution 240, such as membership inference 252, loss across rounds 254, and loss across neighborhood 256. Although subject level attacks are discussed in detail, other attacks 260 which may include item level and user level attacks that can be performed to also provide other types of analysis.

Inference attack execution 240 may access a federated machine learning model 272, in some embodiments, in order to perform inference attacks, including subject level attacks. For example, inference attack execution 240 may send inference requests 212 to federated model host 270 for federated machine learning model 272. Federated machine learning model host 270 may, for instance, be a server or other network accessible system that can receive API or other types of requests to receive inference requests 212.

Federated model host 270 may handle inference requests 212 by applying federated machine learning model 272 to input or other data provided by inference requests 212 in order to generate an inference for the request. These inferences 214 may then be returned to federated machine learning model analysis system 210.

Federated machine learning model analysis system 210 may implement inference attack analysis 230 to determine success measurements for the different inference attacks. For example, success measurements may take various forms. Correct predictions on presence of a subject's data or absence of a subject's data may be counted respectively as hits (e.g., "1") or misses (e.g., "0"). For example, precision (e.g., a proportion of a present predictions of the total number of predictions), recall (e.g., a proportion of actual present predictions that were identified correctly), or a combined success measurement $F_1$, where $$F_1 = \frac{2}{\text{precision}^{-1} + \text{recall}^{-1}}.$$

In some embodiments, inference attack analysis 230 may provide recommendations based on the determined success measurements for the different subject level inference attacks. For example, success measures above certain thresholds (e.g., F scores above 0.9) for one or more inference attacks may be mapped to one or more remedial actions. For example, inference attacks may be more successful depending upon various configuration factors for the federated machine learning model may include data properties, such as sampling distribution and data dimensionality, model design and training, such as the model architecture and the number of training rounds, and federation properties, such as a number of users, subjects, and data points per subject. A recommended remedial action may be to modify a feature such as data dimensionality (e.g., lower data dimensionality), model architecture (e.g., changing to an architecture with a few number of hidden layers), and a number of training rounds (e.g., lowering a number of training rounds). Alternatively (or additionally), mitigation techniques like differential privacy which may apply noise when making local model parameter updates.

Figure 3:
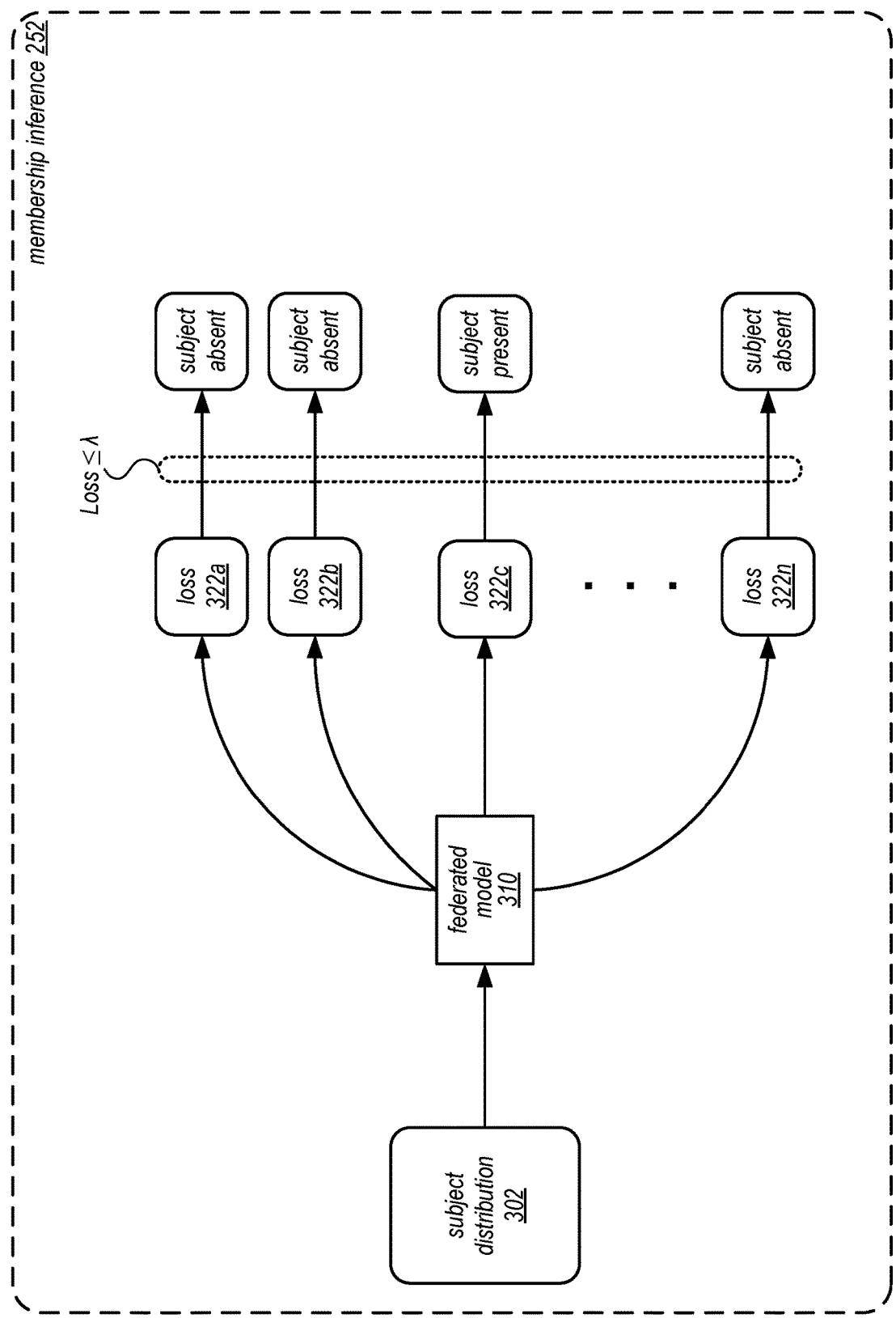
FIG. 3 is a logical block diagram illustrating an example of a membership inference attack on a federated machine learning model, according to some embodiments.
Figure 4:
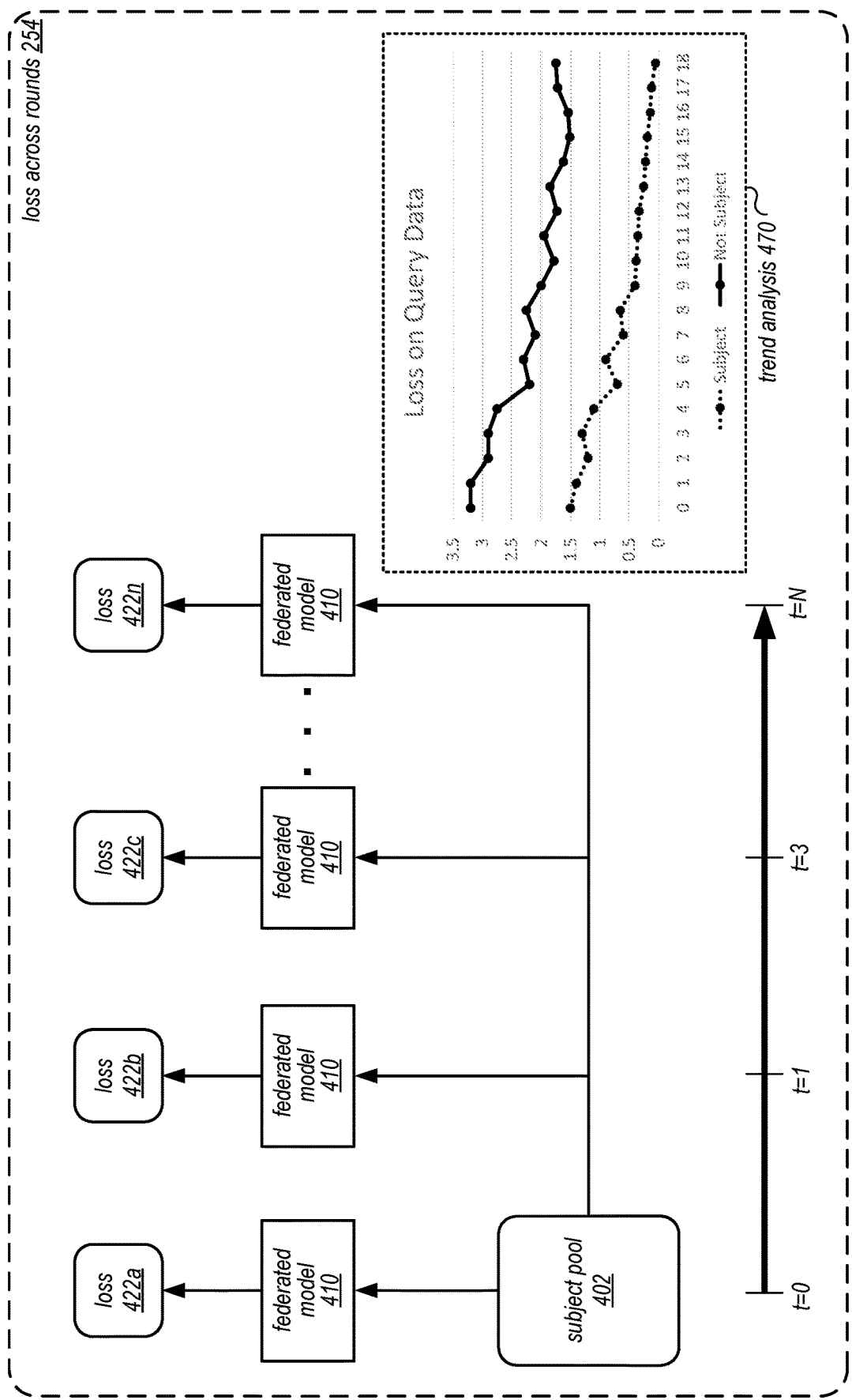
FIG. 4 is a logical block diagram illustrating an example of a loss across rounds inference attack on a federated machine learning model, according to some embodiments.
Figure 5:
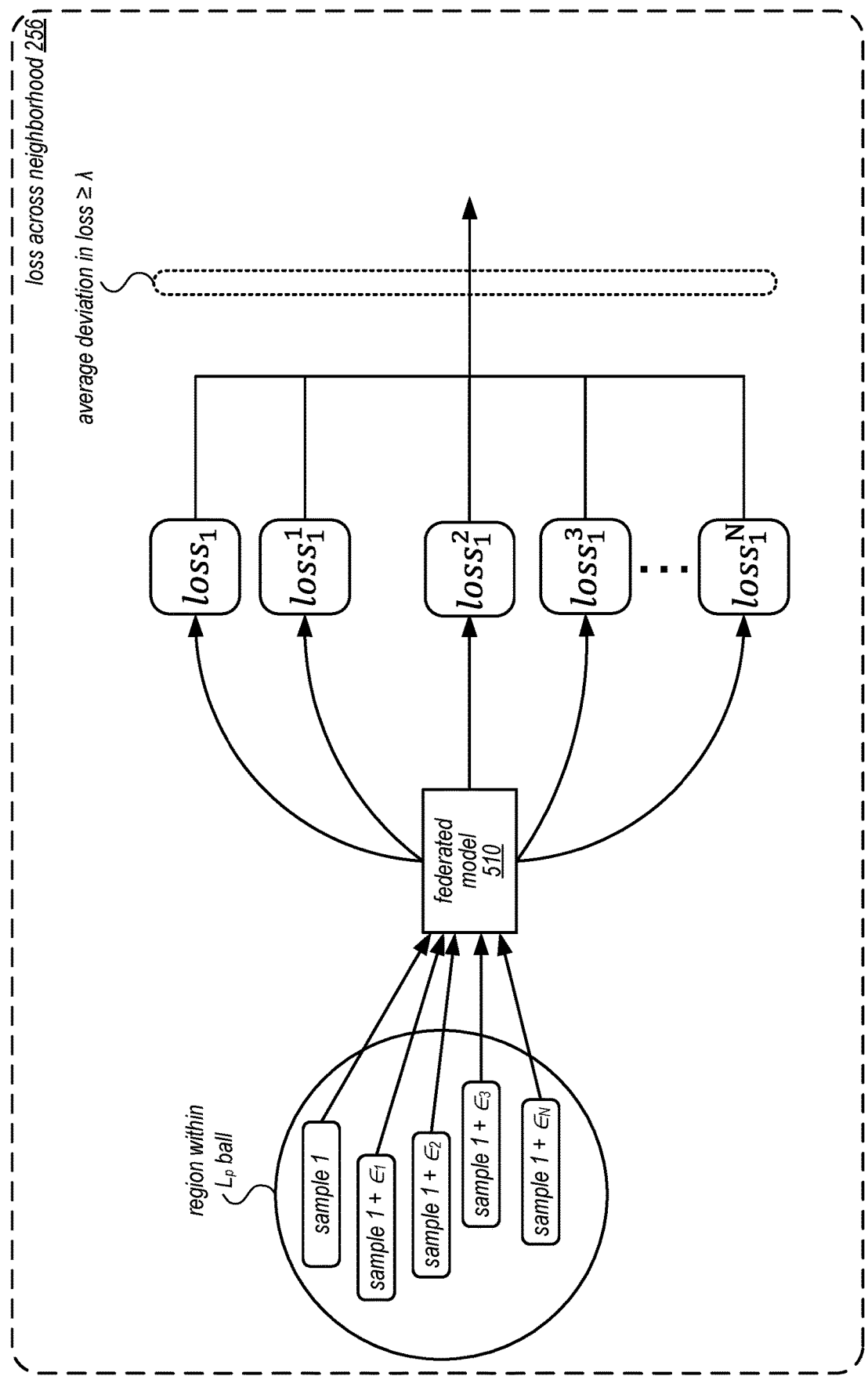
FIG. 5 is a logical block diagram illustrating an example of a loss across neighborhood inference attack on a federated machine learning model, according to some embodiments.

As discussed above, different subject level inference attacks may be performed. In the discussion of FIGS. 3-5 that follow, there may be some common features to the different subject level inference attacks. For example, for the below inference attacks, the system performing the inference attacks may have:

1. Samples (e.g., finite samples) from the distribution of subjects.
2. Access (e.g., via APIs or other interfaces) to obtain predictions (e.g., inferences) from the federated machine learning model $M_i$ after each federation round i.

For instance, if the federated machine learning model analysis system 210 (or an adversary implementing these techniques) is to launch a subject level inference attack against a particular subject, then the capability to quantify and differentiate subjects and identify the particular subject. To perform inference attacks with respect to a particular subject, the federated machine learning model analysis system 210 can be provided with this data as part of a request to perform an analysis. In some embodiments, samples of the particular subject's data may be taken to estimate it. Having access to finite samples is another approach. In some embodiments, the particular subject (the subject of interest), and some samples from other subjects that the system does not care about (can be any combination) may be obtained.

In various embodiments, these subject level inference attacks may be based on a common feature: given the objective of training machine learning models, it is natural to expect that the model's performance on data similar to that seen during training would be better than that not seen during training. This can be quantified in many ways: from raw loss values to robustness in predictions.

The following notation may be used to describe various features of the different subject level inference attacks discussed below. Let m be the number of rounds for which the global model is trained in the federation, with $M_i$ denote the state of the model after training round i has completed. Mo thus represents the state of the model before training starts. Let $l_i(x, y)$ be the loss value between the label y and $M_i(x)$, with $M_i(x)$ denoting the model $M_i$'s prediction on point x.

FIG. 3 is a logical block diagram illustrating an example of a membership inference attack on a federated machine learning model, according to some embodiments. If data from a particular subject is present in the federation and is used in training, the global model would be expected to have a lower loss than data from a subject who was not present in any of the users' local datasets. Based on this understanding, a subject level inference attack for membership may be to:

1.) record loss values for samples from the subject's distribution; and
2.) check if any of them have a value less than a particular threshold.

If the loss is below the threshold, it would indicate the model having seen that particular data (and thus other data from that subject's distribution) during training.

FIG. 3 illustrates this technique. Subject distribution 302 (of a subject of interest) may be a distribution of the subject's data in the training data of the different users used to train federated model 310. Federated model 310 may be accessed and applied to determine different respective loss values for different data from subject distribution 302, such as loss values 322a, 322b, 322c through 322n. These values may then be compared with a threshold value (A). As indicated in the illustrated example for those loss values 322 that are less than or equal to the threshold value, it may be inferred that the subject's data is present in the federated machine learning model.

In some embodiments, techniques for analyzing membership inference results may be performed according to the following formula:

$$c = \sum_{(d_x, d_y) \sim D_s} \mathbb{1}[l_m(d_x, d_y) \leq \lambda]$$

The system can determine whether c is non-zero, or derive an additional threshold on this value (c) based on the metric to be maximized, like precision or recall.

FIG. 4 is a logical block diagram illustrating an example of a loss across rounds inference attack on a federated machine learning model, according to some embodiments. Loss on training data, and thus data from the training distribution, decreases (and eventually converges, based on the level of over-fitting) across training iterations because of how learning algorithms (e.g., gradient descent) work. Therefore data from distributions not seen in the training would probably not exhibit the same trends. It may decrease initially owing to some similarities in the underlying distribution but would likely not decrease consistently or converge to values as low as those for distributions of subjects whose data was present in the federation. Based on this understanding, another subject level inference attack may be performed that:

1.) records loss values for samples from the subject's distribution; and
2.) takes note of how the loss values change as training rounds progress.

The attack first computes the loss across each training round i:

$$c = \sum_{(d_x, d_y) \sim D_s} l_i(d_x, d_y)$$

Then, the system can identify the number of training rounds where the loss decreases after each round:

$$c = \sum_{i=1}^{m} \mathbb{1}[c_i < c_{i-1}]$$

The system can then compute these values for both subjects seen and not seen in the federation, and consequently derive a threshold on this value for subject membership.

FIG. 4 illustrates this subject level inference attack. Subject pool 402 may be multiple subjects to consider for membership in the training data sets for the federated machine learning model. The subject pool 402 may be used to apply federated model 410 and determine respective loss 422 at training rounds at different times (e.g., loss 422a at t=0, loss 422b at t=1, loss 422c at t=3, and loss 422n at t=N). An example of the trend analysis 470 shows that a subject that is present has a trend line that continues down as training rounds increase, whereas the "not subject" or not present trend line, starts trending down but then trends back up during latter training rounds.

FIG. 5 is a logical block diagram illustrating an example of a loss across neighborhood inference attack on a federated machine learning model, according to some embodiments. If the model sees data from a particular subject's distribution, it would be expected to generalize well to data from that distribution. The model would thus expected to be robust to small amounts of noise added to a subject's distribution of data, as opposed to data from distributions of subjects that it has not seen during training. Based on this understanding, multiple data points may be sampled within $L_p$-norm balls around each of the data points in a sample, and note the fluctuation in loss values:

$$c = \sqrt{\sum_{(d_x, d_y) \sim D_s} (l_m(d_x, d_y) - l_m(d_x + \epsilon, d_y))^2}$$

Then, similar to the attack described above with respect to FIG. 3, a threshold can be derived from c and apply it across all samples, counting how many of them fall under the given threshold.

FIG. 5 provides an illustration of this subject level inference attack. Region with $L_p$ ball may have samples 1, $1+\epsilon_1$, $1+\epsilon_2$, $1+\epsilon_3$, $1+\epsilon_N$ taken. Federated model 510 may be applied to these samples to determine respective losses. Then an average of the deviation in loss between sample 1 and the different amounts of noise added to the sample ($1+\epsilon_1$, $1+\epsilon_2$, $1+\epsilon_3$, $1+\epsilon_N$) is compared with a threshold A to determine whether the subject's data is in the training data set for the federated model 510.

Figure 6:
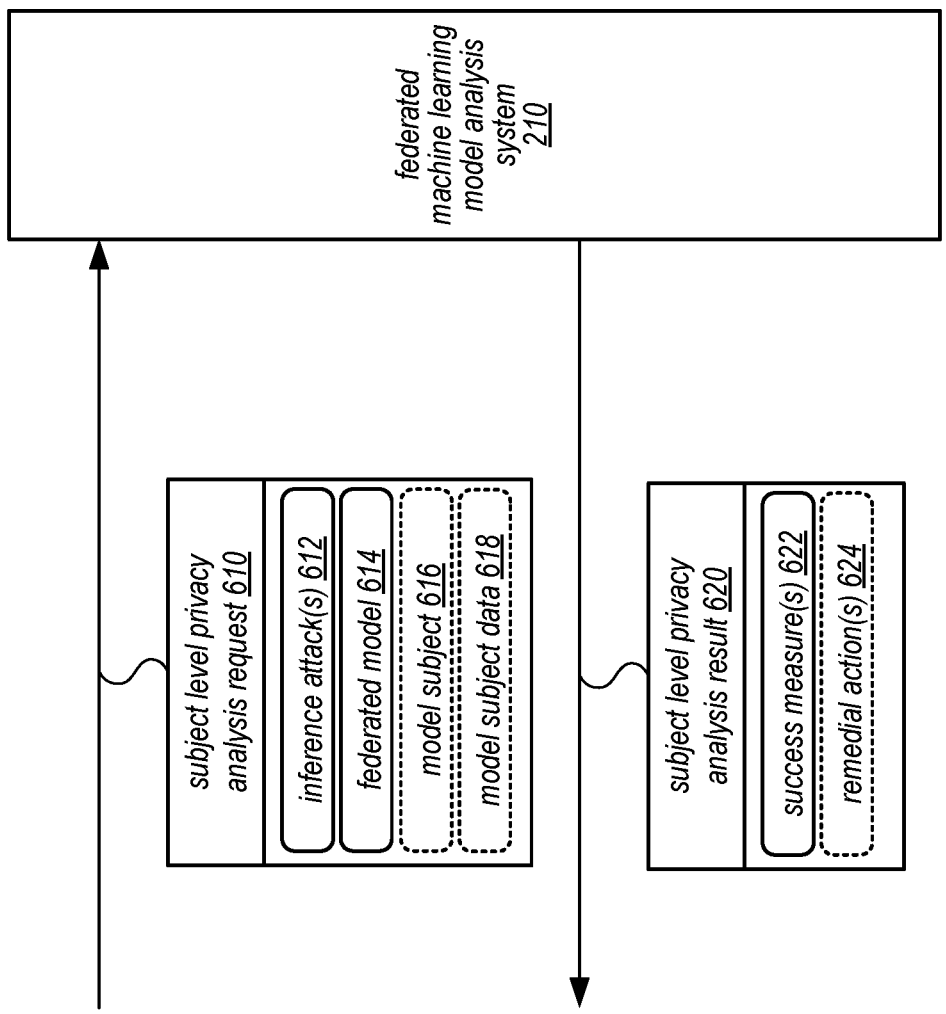
FIG. 6 is a logical block diagram illustrating interactions with an interface of a federated machine learning analysis system, according to some embodiments.

FIG. 6 is a logical block diagram illustrating interactions with an interface of a federated machine learning analysis system, according to some embodiments. As indicated at 610, a subject level privacy analysis request 610 may be received at federated machine learning model analysis system 210 (e.g., via interface 220). The request 610 may include selections of one or more subject level inference attack(s) 612, in some embodiments. The request 610 may include the identification of the federate model 614. For example, an identifier of the federated model or a location of the federated model (e.g., a network address of a host for the federated model) to allow federated machine learning model analysis system 210 to access the federated model as part of performing the inference attack(s) 612.

In some embodiments, additional features of the request 610 may be the subject of interest, model subject 616 (e.g., as an identifier of the subject) and model subject data 618 (e.g., various data values of the subject). As discussed above with regard to FIGS. 3-5, the subject data may be used to analyze and understand the inference attack(s). In some embodiments, multiple model subjects and respective subject data may be specified.

As indicated at 620, federated machine learning model analysis system 210 may provide a subject level privacy analysis result. For example, result 620 may include success measures, such as the various performance values determined for the different subject level inference attacks, such as precision, recall, or $F_1$. In some embodiments, result 620 may include remedial action(s) 624 which may be determined from the success measure(s) of the subject level inference attacks. For example, various recommendations to change the configuration of the federated machine learning model and/or mitigation actions to take when training the model may be included.

Some of the different subject level inference attacks discussed above with regard to FIGS. 3-5, rely upon a loss threshold as a criteria for determining presence or absence of the data of a subject in the training set for a federated machine learning model. However, in other embodiments of these subject level inference attacks, other criteria may be used in addition to (or instead of) loss threshold. For example, criteria that measures model generalization and robustness as criteria for attack.

Figure 7:
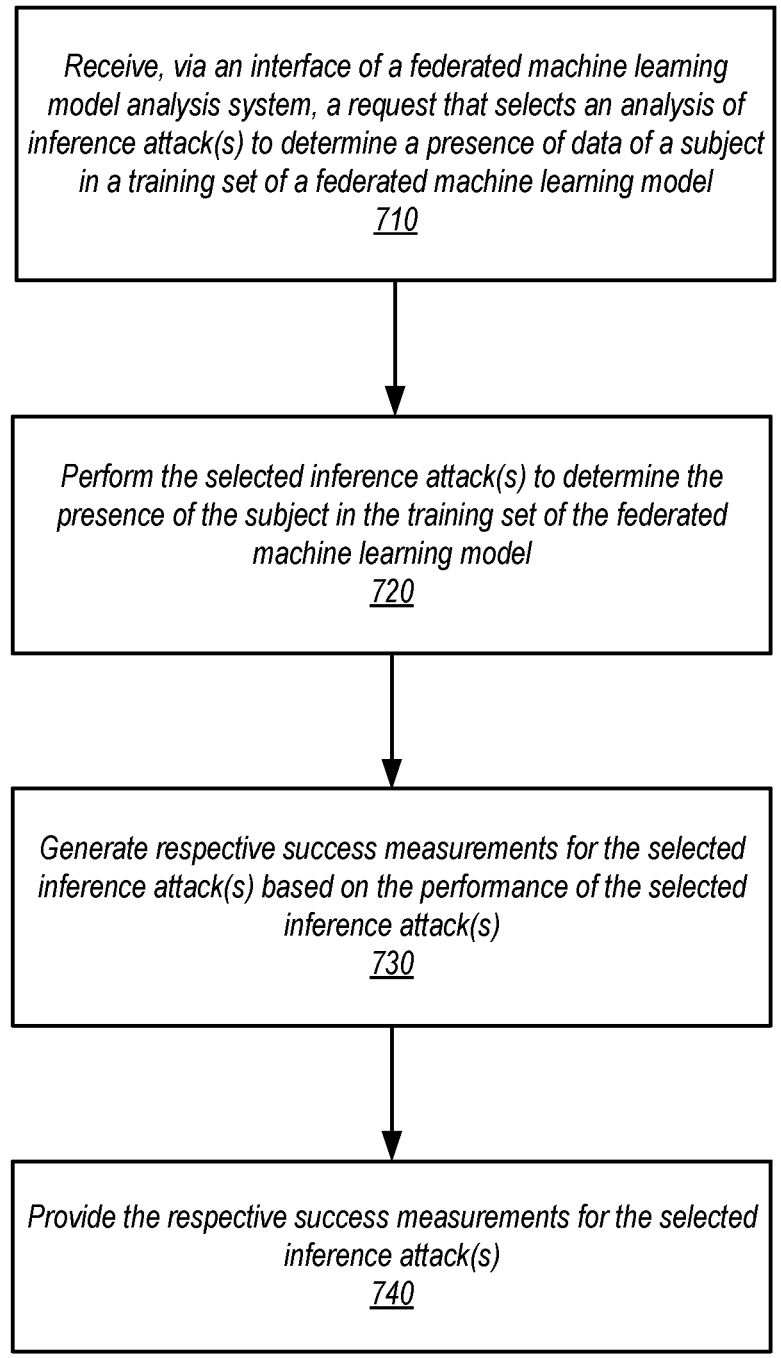
FIG. 7 is a high-level flowchart illustrating techniques to implement subject level privacy attack analysis for federated learning, according to some embodiments.

Various different systems, services, or applications may implement the techniques discussed above. For example, FIG. 8, discussed below, provides an example computing system that may implement various ones of the techniques discussed above. FIG. 7 is a high-level flowchart illustrating techniques to implement subject level privacy attack analysis for federated learning, according to some embodiments. These techniques may be implemented on systems similar to those discussed above with regard to FIGS. 1-2 as well as other machine learning systems, services, or platforms, or those that incorporate federated machine learning techniques.

As indicated at 710, a request that selects an analysis of inference attack(s) to determine a presence of data of a subject in a training set of a federated machine learning model. The request may be received via an interface of a federated machine learning model analysis system. As discussed above with regard to FIG. 6, the request may include additional features, such as the identity of the federated machine learning model and/or the model subject and model subject data to use in performance of the analysis. In some embodiments, additional types of inference attacks or other analysis may be requested, such as user level or item level privacy analyses may be requested. In some embodiments, the request may be received from an individual operating an interface (e.g., command line, GUI, etc.) to request the analysis. In some embodiments, the request may be received as part of an automated evaluation system to request via an API inference attacks for analysis, the results of which may trigger various alarms or other responsive actions, including remedial actions that can be taken.

As indicated at 720, the selected inference attack(s) to determine the presence of the subject in the training set of the federated machine learning model may be performed, in some embodiments. For example, as discussed above with regard to FIGS. 3-5, different subject level inference techniques may include features such as using subject data (or samples or modified subject data) as input to the federated machine learning model to receive an inference from the machine learning model. The loss function (e.g., based the difference between the prediction (inference) and actual value) determined from the application of the federated machine learning to the input subject data may then be used in various ways to determine whether the inference attack can successfully determine the presence or absence of the subject's data from the training data set. In some embodiments, the inferences may be performed at different intervals (e.g., with respect to different training rounds as discussed above with regard to FIG. 4).

As indicated at 730, respective success measurements for the selected inference attack(s) based on the performance of the selected inference attack(s) may be generated, according to some embodiments. As discussed above, success measurements of the selected inference attack(s) may be indicative of the ability of the selected inference attacks to detect the presence or absence of a subject in the federated machine learning model. For example, success measurements may include precision, recall, or $F_1$, among others.

As indicated at 740, provide the respective success measurements for the selected inference attack(s) via the interface of the federated machine learning model analysis system, according to some embodiments. For example, text-based displays of the respective success measurements may be provided. In some embodiments, visualizations of success measurements (e.g., graphs, etc.) may be provided to indicate the respective success measurements. As noted earlier, in some embodiments, remedial actions may be provided (e.g., as recommendations), such as various configuration changes and/or mitigation actions to take to reduce the vulnerability of the federated machine learning model to subject level privacy leaks.

Figure 8:
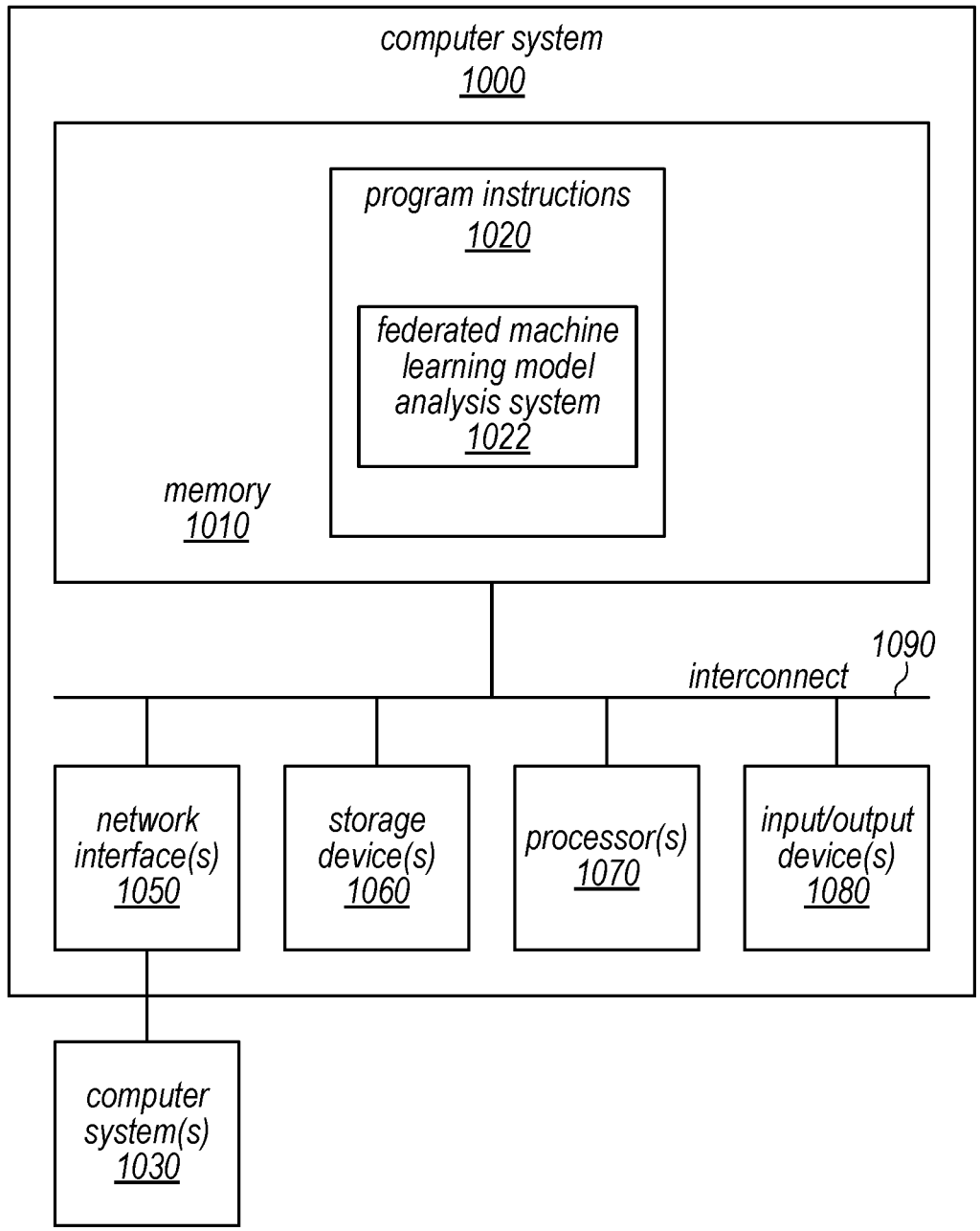
FIG. 8 illustrates an example computing system, according to some embodiments.

FIG. 8 illustrates a computing system configured to implement the methods and techniques described herein, according to various embodiments. The computer system 1000 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

The mechanisms for implementing subject level privacy attack analysis for federated learning, as described herein, may be provided as a computer program product, or software, that may include a non-transitory, computer-readable storage medium having stored thereon instructions, which may be used to program a computer system (or other electronic devices) to perform a process according to various embodiments. A non-transitory, computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 1000 may include one or more processors 1070; each may include multiple cores, any of which may be single or multi-threaded. Each of the processors 1070 may include a hierarchy of caches, in various embodiments. The computer system 1000 may also include one or more persistent storage devices 1060 (e.g. optical storage, magnetic storage, hard drive, tape drive, solid state memory, etc.) and one or more system memories 1010 (e.g., one or more of cache, SRAM, DRAM, RDRAM, EDO RAM, DDR 10 RAM, SDRAM, Rambus RAM, EEPROM, etc.). Various embodiments may include fewer or additional components not illustrated in FIG. 8 (e.g., video cards, audio cards, additional network interfaces, peripheral devices, a network interface such as an ATM interface, an Ethernet interface, a Frame Relay interface, etc.)

The one or more processors 1070, the storage device(s) 1050, and the system memory 1010 may be coupled to the system interconnect 1040. One or more of the system memories 1010 may contain program instructions 1020. Program instructions 1020 may be executable to implement various features described above, including a federated machine learning model analysis system 1022 as discussed above with regard to FIG. 1 that may perform the various training and application of re-ranking models, in some embodiments as described herein. Program instructions 1020 may be encoded in platform native binary, any interpreted language such as Java™ byte-code, or in any other language such as C/C++, Java™, etc. or in any combination thereof. System memories 1010 may also contain LRU queue(s) 1026 upon which concurrent remove and add-to-front operations may be performed, in some embodiments.

In one embodiment, Interconnect 1090 may be configured to coordinate I/O traffic between processors 1070, storage devices 1070, and any peripheral devices in the device, including network interfaces 1050 or other peripheral interfaces, such as input/output devices 1080. In some embodiments, Interconnect 1090 may perform any necessary protocol, timing or other data transformations to convert data signals from one component (e.g., system memory 1010) into a format suitable for use by another component (e.g., processor 1070). In some embodiments, Interconnect 1090 may include support for devices attached through various types of peripheral buses, such as a variant of the Peripheral Component Interconnect (PCI) bus standard or the Universal Serial Bus (USB) standard, for example. In some embodiments, the function of Interconnect 1090 may be split into two or more separate components, such as a north bridge and a south bridge, for example. In addition, in some embodiments some or all of the functionality of Interconnect 1090, such as an interface to system memory 1010, may be incorporated directly into processor 1070.

Network interface 1050 may be configured to allow data to be exchanged between computer system 1000 and other devices attached to a network, such as other computer systems, or between nodes of computer system 1000. In various embodiments, network interface 1050 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1080 may, in some embodiments, include one or more display terminals, keyboards, keypads, touchpads, scanning devices, voice or optical recognition devices, or any other devices suitable for entering or retrieving data by one or more computer system 1000. Multiple input/output devices 1080 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1050.

Those skilled in the art will appreciate that computer system 1000 is merely illustrative and is not intended to limit the scope of the methods for providing enhanced accountability and trust in distributed ledgers as described herein. In particular, the computer system and devices may include any combination of hardware or software that may perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed:

1. A system, comprising:
    at least one processor;
    a memory, comprising program instructions that when executed by the at least one processor cause the at least one processor to implement a federated machine learning model analysis system, the federated machine learning model analysis system configured to:
        receive, via an interface of the federated machine learning model analysis system, a request that selects an analysis of one or more inference attacks to determine a presence of data of a subject in a training set of a federated machine learning model;
        access the federated machine learning model to perform the selected one or more inference attacks to determine the presence of the data of the subject in the training set of the federated machine learning model;
        analyze respective inferences produced by the federated machine learning model as part of performing the selected one or more inference attacks to determine respective success measurements for the selected one or more inference attacks; and
        provide, via the interface, the respective success measurements for the selected one or more inference attacks.

2. The system of claim 1, wherein one of the selected one or more inference attacks is a subject level membership inference attack that compares respective loss values determined from an application of the federated machine learning model to a subject distribution for the subject with a loss threshold to indicate the presence or absence of the subject distribution.

3. The system of claim 1, wherein one of the selected one or more inference attacks is a subject level loss across rounds inference attack that determines respective loss values from an application of the federated machine learning model to a subject pool for the subject determined at different respective training rounds to indicate the presence or absence of the subject according to a trend analysis of the respective loss values.

4. The system of claim 1, wherein one of the selected one or more inference attacks is a subject level loss across neighborhood inference attack that determines respective loss values from an application of the federated machine learning model to samples within a ball region of the subject with respectively added noise to indicate the presence or absence of the subject according to a comparison with a loss threshold.

5. The system of claim 1, wherein the request that selects the one or more inference attacks further identifies the federated machine learning model.

6. The system of claim 1, wherein the respective success measurements for the selected one or more inference attacks are provided as part of a result that also comprises one or more remedial actions.

7. The system of claim 6, wherein the one or more remedial actions include a change to a configuration of the federated machine learning model.

8. A method, comprising:
 receiving, via an interface of a federated machine learning model analysis system, a request that selects an analysis of one or more inference attacks to determine a presence of data of a subject in a training set of a federated machine learning model;
 performing, by the federated machine learning model analysis system, the selected one or more inference attacks to determine the presence of the data of the subject in the training set of the federated machine learning model;
 generating, by the federated machine learning model analysis system, respective success measurements for the selected one or more inference attacks based, at least in part, on the performance of the selected one or more inference attacks; and
 providing, via the interface of the federated machine learning model analysis system, the respective success measurements for the selected one or more inference attacks.

9. The method of claim 8, wherein one of the selected one or more inference attacks is a subject level membership inference attack that compares respective loss values determined from an application of the federated machine learning model to a subject distribution for the subject with a loss threshold to indicate the presence or absence of the subject distribution.

10. The method of claim 8, wherein one of the selected one or more inference attacks is a subject level loss across rounds inference attack that determines respective loss values from an application of the federated machine learning model to a subject pool for the subject determined at different respective training rounds to indicate the presence or absence of the subject according to a trend analysis of the respective loss values.

11. The method of claim 8, wherein one of the selected one or more inference attacks is a subject level loss across neighborhood inference attack that determines respective loss values from an application of the federated machine learning model to samples within a ball region of the subject with respectively added noise to indicate the presence or absence of the subject according to a comparison with a loss threshold.

12. The method of claim 8, wherein the respective success measurements for the selected one or more inference attacks are provided as part of a result that also comprises one or more remedial actions.

13. The method of claim 12, wherein the one or more remedial actions include a mitigation action to be applied when training the federated machine learning model.

14. The method of claim 8, wherein the request that selects the one or more inference attacks further includes the subject and subject data to use for performing the selected one or more inference attacks.

15. One or more non-transitory, computer-readable storage media, storing program instructions that when executed on or across one or more computing devices, cause the one or more computing devices to implement:
 receiving, via an interface of a federated machine learning model analysis system, a request that selects an analysis of one or more inference attacks to determine a presence of data of a subject in a training set of a federated machine learning model;
 performing, by the federated machine learning model analysis system, the selected one or more inference attacks to determine the presence of the data of the subject in the training set of the federated machine learning model;
 analyzing respective inferences produced by the federated machine learning model as part of performing the selected one or more inference attacks to determine respective success measurements for the selected one or more inference attacks; and
 providing, via the interface of the federated machine learning model analysis system, the respective success measurements for the selected one or more inference attacks.

16. The one or more non-transitory, computer-readable storage media of claim 15, wherein one of the selected one or more inference attacks is a subject level membership inference attack that compares respective loss values determined from an application of the federated machine learning model to a subject distribution for the subject with a loss threshold to indicate the presence or absence of the subject distribution.

17. The one or more non-transitory, computer-readable storage media of claim 15, wherein one of the selected one or more inference attacks is a subject level loss across rounds inference attack that determines respective loss values from an application of the federated machine learning model to a subject pool determined at different respective training rounds to indicate the presence or absence of the subject according to a trend analysis of the respective loss values.

18. The one or more non-transitory, computer-readable storage media of claim 15, wherein one of the selected one or more inference attacks is a subject level loss across neighborhood inference attack that determines respective loss values from an application of the federated machine learning model to samples within a ball region of the subject with respectively added noise to indicate the presence or absence of the subject according to a comparison with a loss threshold.

19. The one or more non-transitory, computer-readable storage media of claim 15, wherein the respective success measurements for the selected one or more inference attacks are provided as part of a result that also comprises one or more remedial actions.

20. The one or more non-transitory, computer-readable storage media of claim 19, wherein the one or more remedial actions include a mitigation action to be applied when training the federated machine learning model.

* * * * *